United States Patent [19]

Havens

[11] Patent Number: 4,898,771
[45] Date of Patent: Feb. 6, 1990

[54] AGENT FOR IMPARTING ANTISTATIC CHARACTERISTICS TO A THERMOPLASTIC POLYMER AND A THERMOPLASTIC POLYMER COMPOSITION CONTAINING THE AGENT

[75] Inventor: Marvin R. Havens, Greer, S.C.

[73] Assignee: W. R. Grace & Co.-Conn., Duncan, S.C.

[21] Appl. No.: 247,215

[22] Filed: Sep. 21, 1988

Related U.S. Application Data

[62] Division of Ser. No. 918,754, Oct. 14, 1986, Pat. No. 4,800,115.

[51] Int. Cl.$^4$ .............................................. B05D 3/02
[52] U.S. Cl. .................................... 428/316; 524/306; 524/317; 524/377; 524/910
[58] Field of Search ....................... 524/317, 377, 910; 428/516

[56] References Cited

U.S. PATENT DOCUMENTS

| | | |
|---|---|---|
| 3,022,543 | 2/1962 | Baird, Jr. et al. . |
| 3,164,481 | 1/1965 | Shibe . |
| 3,220,985 | 11/1965 | Breslow . |
| 3,354,138 | 11/1967 | Burr .................................. 524/377 |
| 3,425,981 | 2/1969 | Puletti et al. . |
| 3,441,552 | 4/1969 | Rombusch et al. . |
| 3,576,649 | 4/1971 | Brazier . |
| 3,741,253 | 6/1973 | Brax et al. . |
| 3,821,182 | 6/1974 | Baird, Jr. et al. . |
| 4,048,428 | 9/1977 | Baird, Jr. et al. . |
| 4,117,193 | 9/1978 | Tsuchiya et al. . |
| 4,188,443 | 2/1980 | Mueller et al. . |
| 4,194,039 | 3/1980 | Mueller . |
| 4,229,241 | 10/1980 | Mueller . |
| 4,268,583 | 5/1981 | Hendy . |
| 4,274,900 | 6/1981 | Mueller et al. . |
| 4,494,651 | 1/1985 | Malcom . |
| 4,554,210 | 11/1985 | Long et al. .......................... 428/516 |
| 4,576,669 | 3/1986 | Caputo . |
| 4,579,516 | 4/1986 | Caputo . |
| 4,600,743 | 7/1986 | Shizuki et al. . |

OTHER PUBLICATIONS

ICI America's Inc., ATMER® 129.
Federal Test Method Standard 101C, Method 4046.1, "Electrostatic Properties of Materials".
"Computer Analysis of Static Decay Curves", Fowler, Lovin, and Carson, vol. 3, No. 3, published in Sep. of 1987 in EOS/ESD magazine Threshold.

*Primary Examiner*—Joseph L. Schofer
*Assistant Examiner*—Mark Sweet
*Attorney, Agent, or Firm*—John J. Toney; William D. Lee; Jennifer L. Skord

[57] ABSTRACT

Disclosed is a thermoplastic polymeric composition having antistatic characteristics and a method to make same. The composition comprises a thermoplastic polymer in admixture with an antistatic agent. In one embodiment the polymer is polyethylene and the agent is a mixture of polyethoxylated cetyl alcohol and glyceryl monostearate. Also disclosed is the antistatic polymeric composition in a film, which is useful for packaging static sensitive devices such as electronic circuit boards, or for packaging devices that must be protected from static electricity such as devices in a medical operating room where explosive oxygen and/or ether are present.

7 Claims, No Drawings

AGENT FOR IMPARTING ANTISTATIC CHARACTERISTICS TO A THERMOPLASTIC POLYMER AND A THERMOPLASTIC POLYMER COMPOSITION CONTAINING THE AGENT

This is a divisional application of application Ser. No. 918,754, filed on Oct. 14, 1986 now U.S. Pat. No. 4,800,115.

This invention relates to an agent which will, when added to a thermoplastic polymer, impart antistatic characteristics thereto. Such antistatic polymers are useful, for instance, in making packaging for electronic devices that are sensitive to static electricity.

BACKGROUND OF THE INVENTION

When two surfaces are brought in contact with each other, a transfer of electrons may occur resulting in a residual static electrical charge when the surfaces are separated. This phenomena is known as triboelectricity. If the surface is composed of a material that is a conductor, the electrons will dissipate quickly thereby eliminating the excess charge. On the other hand, if the surface is composed of a material that is an insulator (a dielectric), the surface charge takes much longer to dissipate.

Thermoplastic polymers, however, are typically excellent insulators, having an extremely high surface resistivity of more than $10^{14}$ ohms/square, and thus they are unsatisfactory for uses that require an antistatic nature. As the polymers are nonconductive, they accumulate high charges promoting an attraction for dust and dirt, and they can discharge to any lower potential body with which they come in contact. To modify a polymer so that it will have antistatic characteristics, the resistivity of it must be decreased, i.e. the conductivity is increased which in turn causes an increase in the rate of static dissipation. Increase in conductivity has been accomplished in the past by the use of antistatic agents to promote static-charge decay of surfaces thereby reducing clinging effect, eliminating spark discharge, and preventing accumulation of dust.

It is well known that static charge can be reduced by increasing the moisture content of the atmosphere, and thus the approach in the past has been to use an antistatic agent which will chemically modify the polymer to impart hydrophillic properties to it by providing functional groups that attract moisture to it. For instance, it is well known to apply external antistatic agents onto polymers by conventional coating methods. Also, it is well known to apply internal antistatic agents which are volume dispersed in the polymer; i.e. incorporated into the polymer by compounding or extrusion prior to or during molding or film-forming operations. These agents work by migrating to the polymer surface. This migration is colloquially referred to in the art of polymer chemistry as a "blooming" effect. When the antistatic agent has not remained volume dispersed but instead has bloomed to the surface, the mechanism for moisture attraction is the same as with the external antistatic agents. The atmospheric moisture is attracted causing decay of static charges. Accordingly a high rate of blooming is required.

The following known antistatic agents are believed to function in the above-mentioned manner.

An example of an external antistatic agent is described in U.S. Pat. No. 3,223,545 to Gallaugher et al which discloses a dialkanol amide of the formula

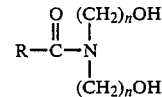

wherein R is a $C_6$ to $C_{16}$ alkyl and n is an integer from 2 to 4, dispersed in a volatile liquid which is applied to the surface of a solid polymer.

Another external antistatic agent is described in U.S. Pat. No. 4,268,583 (1981) to Hendy which relates to an antistatic film having a polypropylene substrate and a polymeric heat-sealable surface layer on which is present an antistatic composition comprising (a) a quaternary ammonium compound, such as choline chloride, (b) an organic polyol containing at least two free hydroxyl groups, such as glycerol, (c) a glyceride of a long chain fatty acid, such as glyceryl monostearate, and, optionally, (d) an ethoxylated amine salt, such as an ethoxylated tallow amine sulphate. The composition is conveniently applied directly to the surface of a polymeric extrudate which is subsequently drawn to yield an oriented film, but at least the glyceride may be preblended into the film-forming polymer.

One example of an internal antistatic agent is described in U.S. Pat. No. 3,220,985 to Breslow which discloses modifying hydrocarbon polymers with a monosulfonazide of the formula $RSO_2N_3$, where R is an organic radical inert to the modification reaction. For instance, to an acetone slurry of finely divided polypropylene is added para-toluene sulfonazide, followed by agitation at room temperature to evaporate the acetone solvent. The resultant is then heated at 160° C. for 2 hours.

Another internal antistatic agent is described in U.S. Pat. No. 3,164,481 to Shibe which discloses combining a quaternary ammonium benzosulfimide with a plastic. (For clarity, it is mentioned benzosulfimide is also known as saccharin.) For instance, in Shibe is disclosed Epolene E (a polyethylene supplied by Eastman Chemical Products, Inc., Kingsport, Tenn.) melted together with dodecyl benzyl trimethyl ammonium benzosulfimide and the molten resultant is spread out in a sheet.

Also of interest is the internal antistatic agent described in U.S. Pat. No. 3,576,649 to Brazier. This patent relates to a package for electrically non-conductive pulverulent material. The package has an inner layer of heat sealable ethylene polymer to which is added a fatty acid amide in a quantity such that the pulverulent material being packaged will not be attracted to film areas that are to be heat sealed to form a completed package, such as may occur if a charge of static electricity is generated when film from which the package is made passes through a packaging machine of the form-and-fill type.

Also of interest is the internal antistatic agent described in U.S. Pat. No. 3,441,552 to Rombusch et al. The patent discloses incorporating an alkoxypropylamine of the formula

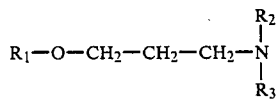

into a polyolefin where $R_1$ represents an alkyl, alkenyl, alkylcycloalkyl, aryl, alkylaryl, or alkenylaryl group of 6 to 25, preferably 8 to 18 carbon atoms in the alkyl or alkenyl moieties and 4 to 18, preferably 6 to 12 carbon atoms in the cycloalkyl moiety, and 6 to 14, preferably 6 to 10 carbon atoms in the aryl moiety; $R_2$ and $R_3$ can reach represent a hydrogen atom, or an alkyl or alkenyl group of 1 to 5 carbon atoms. For instance, 100 g of octadecyloxy-propyl-N,N-dimethylamine are homogenized in a blender with 10 kg of polypropylene. The resultant is granulated and injection mold plates are produced from the granulation.

Another internal antistatic agent is disclosed in U.S. Pat. No. 4,554,210 (1985) to Long et al, which claims a laminated, anti-static, heat sealable packaging material for packaging and preventing contamination of an electrostatically sensitive item packed in said packaging material, comprising: a first outer layer of heat-sealable, semi-conductive polyethylene having a surface resistivity at least $1 \times 10^{16}$ ohms per square; a second outer layer of heat-sealable, semi-conductive polyethylene having a surface resistivity at least $1 \times 10^{16}$ ohms per square; and a middle layer of heat-sealable polyethylene impregnated with a sloughable, electrically-conductive material providing said middle layer with a volume resistivity no more than $1 \times 10^3$ ohms per centimeter, said middle layer bondedly sandwiched between said first and second layers to prevent said electrically-conductive material sloughing from said middle layer to contaminate an electrostatically sensitive item when said item is heat-sealably packaged in said packaging material.

Another internal antistatic agent is disclosed in U.S. Pat. No. 4,600,743 (1986) to Shizuki et al which describes an antistatic fiber obtained by melt spinning of a fiber-forming thermoplastic polymer containing at least one of polyoxyalkylene glycol and its derivatives in an amount of not less than 0.5% by weight, characterized in that said fiber has a half life time of electric charge leakage of not more than 150 seconds before and after treatment with a weight decreasing agent and, when treated with a weight decreasing agent, provides a number of streaks arranged in parallel in the lengthwise direction at the surface.

Another internal antistatic agent is disclosed in U.S. Pat. No. 4,117,193 (1978) to Tsuchiya et al, wherein there is disclosed a novel composite film prepared by melt extrusion laminating a polymer blend composition comprising a low-crystalline resin of an ethylene-butene copolymer and a polyolefin resin having incorporated therein a lubricant and an anti-blocking agent onto a surface or surfaces of a uniaxially stretched polypropylene film followed by stretching the laminate film in the direction perpendicular to the direction in which said polypropylene has been stretched and optionally subjecting the resulting film to corona discharge treatment.

The antistatic agents useful in the present invention are substantially non-hygroscopic and substantially-non-migratable. Thus, unlike with the previous antistatic polymeric compositions, the antistatic properties of the antistatic polymeric composition of the present invention are substantially independent of ambient relative humidity and the agent substantially remains volume dispersed in the polymer. Accordingly, the problem of surface contamination and corrosion when a static sensitive device was in contact with the previous antistatic polymeric compositions is obviated. For instance, the present polymer containing the agent may be made into a single and/or multi-ply film. Such films have an increased tendency to dissipate electrostatic charges. For instance, the composition may be admixed in and/or extruded together with polymers known for their strength such as the polyethylenes, for instance ethylene vinyl acetate (EVA) or linear low density polyethylene (LLDPE), to make a film. Such a film is useful for making packaging, such as an over-wrap or bag, for electronic devices that are sensitive to static electricity. Such a film may also be fashioned to have cushioning characteristics by using bubble cap (also known as air cushioning) machinery such as that described in U.S. Pat. No. 4,576,669 and U.S.Pat. No. 4,579,516, both to Caputo, to make a bubble cap packaging which provides cushioning and then bagging or wrapping a circuit board therewith. Such a cushioning bubble cap material is also useful in lining a portable work station used for storage and transportation of static electricity sensitive devices such as the work stations disclosed in U.S. Pat. No. 4,494,651 issued in 1985 to Malcolm. Also such a film, which may or may not be in a cushion form, is useful to make a package for devices in a medical operating room where explosive oxygen and/or ether are present and thus protection from static electricity must be provided.

Therefore, it is an object of the present invention to provide an antistatic polymeric composition wherein the antistatic agent is substantially non-migratable and substantially remains volume dispersed in the polymer. It is a further object to provide the antistatic polymeric composition in single-ply or multi-ply film useful for wrapping static sensitive devices. It is also an object to provide such films having an increased tendency to dissipate electrostatic charges.

SUMMARY OF THE INVENTION

The present invention provides a thermoplastic polymeric composition having antistatic characteristics, said composition comprising a thermoplastic polymer in admixture with an antistatic agent.

DETAILED DESCRIPTION OF THE INVENTION

The resultant polymeric composition of the present invention is substantially more conductive as compared to a like polymer that does not contain the agent of this invention. When incorporated into the polymer so that the polymer contains less than about 20 percent byweight, more preferably less than about 15 percent by weight, of the agent, the agent will generally increase the conductivity of the polymer by an order of magnitude up to several orders of magnitude. There is no particular method required for incorporating the agent into the polymer, and any of the well-known solvent "wet" blending, melt blending, or dry blending methods, such as those discussed in the "BACKGROUND OF INVENTION" section above, may be employed.

This increased conductivity is also exhibited by the ability of the polymer containing the agent to promote static charge decay, i.e. to dissipate a static charge. The polymer alone will not dissipate a static charge, but the polymer containing the agent is able to dissipate 99% of an applied static charge of ±5000 volts direct current in a short amount of time, i.e. less than 20, more preferably less than 5, most preferably less than 2 seconds (2000 milliseconds).

The Department of Defense (DOD) and the Electronics Industry Association (EIA) each have their own standards on surface resistivity of a material in ohms/-square as follows:

| SURFACE RESISTIVITY RANGES | | | |
|---|---|---|---|
| Insulative | Antistatic | Static Dissipative | Conductive |
| DOD Greater Than $10^{14}$ | $10^{14}$ to $10^9$ | $10^9$ to $10^5$ | Less Than $10^5$ |
| EIA Greater Than $10^{13}$ | $10^{13}$ to $10^5$ | | Less Than $10^5$ |

As can be seen, there are two main differences. One is that EIA defines insulative as above about 10—ohms/square, whereas DOD defines insulative as above about 10–ohms/square. The other difference is that EIA has one range of about $10^{13}$ to about $10^5$ ohms/square as antistatic, which results in antistatic being synonymous with static dissipative. On the other hand, DOD. divides this into two separate ranges of about $10^{14}$ to about $10^9$ ohms/square for antistatic and about $10^9$ to about $10^5$ ohms/square for static dissipative. Frequently the literature, especially older literature, equates antistatic with static dissipative in discussions about static electricity.

Thus, the term "antistatic" as used herein describes material having a surface resistivity in the range of about $10^9$ to $10^{14}$ ohms/square (Department of Defense standard) and/or a material which can dissipate 99% of an applied static charge of $\pm 5000$ volts direct current in a short amount of time, preferably less than about 20 seconds, more preferably less than about 5 seconds, most preferably less than about 2 seconds (Federal Test Method Standard 101C, Method 4046.1, "Electrostatic Properties of Materials"), and/or a material having a surface resistivity in the range of about $10^5$ to $10^{13}$ ohms/square (an alternative standard of the Electronics Industry Association).

Manufacturing of films may be accomplished as follows. For instance, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form. After a post extrusion cooling, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermo-plastic material may generally be stated to be below the crystalline melting point of the material but above the second order transition temperature (sometimes referred to as the glass transition point) thereof. Within this temperature range, the material may be effectively oriented. The terms "orientation" or "oriented" are used herein to describe generally the process steps and resultant product characteristics obtained by stretching and immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction monoaxial orientation results. When the stretching force is simultaneously applied in two directions biaxial orientation results. The term oriented is also herein used interchangably with the term "heat-shrinkable" with these terms designating a material which has been stretched and set by cooling while substantially retaining its stretched dimensions. An oriented (i.e. heat-shrinkable) material will tend to return to its original un-stretched (unextended) dimensions when heated to an appropriate elevated temperature.

Returning to the basic process for manufacturing the film as discussed above, it can be seen that the film, once extruded (or coextruded if it is a multi-layer film) and initially cooled is then reheated to within its orientation temperature range and oriented by stretching. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to cool the film rapidly and thus set or lock-in the oriented molecular configuration.

Of course, if a film having little or no orientation is desired, e.g. non-oriented or non-heat shrinkable film, the film may be formed from a non-orientable material or, if formed from an orientable material may be formed from a tube by using a "trapped bubble" technique commonly known as the "hot blown" technique. In forming a hot blown film, the tube is not cooled initially after extrusion or coextrusion but rather is first stretched by a hot blown bubble essentially immediately after extrusion while the tube is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

Whichever film has been made (the non-oriented molecular configuration or the stretch-oriented molecular configuration), it may then be stored in rolls and utilized to package a wide variety of items. If the material was manufactured by "trapped bubble" techniques the material may still be in tubular form or it may have been slit and opened up to form a sheet of film material. In this regard, the product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

If the material is of the heat-shrinkable type, then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such a bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, conventional thermoforming or laminating techniques maybe employed. For instance, multiple layers may be first co-extruded with additional layers thereafter being extrusion coated or laminated thereon, or two multi-layer tubes may be coextruded with one of the tubes thereafter being extrusion coated or laminated onto the other.

In the examples below that involve multilayer structures, the multilayer films were made by a conventional method of manufacturing, known as tubular coextrusion, and colloquially called the hot blown bubble technique to achieve an essentially non-oriented (non-heat-shrinkable) film. A tubular process was utilized wherein a primary coextruded tube of the film was biaxially stretched with internal pressure in the transverse direction and with the use of pinch rolls at different speeds in the machine direction. Then the stretched bubble was cooled and collapsed, and the film wound up as flattened, seamless, tubular film to be used later to make bags, bubble cap, et cetera. When film is made by a tubular process, the tubular film is desirably fully coextruded, as full coextrusion is advantageous in that all layers of the multilayer film are directly melt joined for enhanced interlayer strength. Also, in some of the embodiments, the tube was slit longitudinally, and the two half structures were laminated together to provide a balanced film structure such as in Example VII.

Also, in some embodiments the film structure was then guided through an ionizing radiation field; for example, through the beam of an electron accelerator to receive a radiation dosage in the range up to about 12 megarads (MR). Irradiation of the overall multi-layer film structure enhances structural integrity, as measured by abuse resistance, tensile strength, and/or puncture rsistance, et cetera. The irradiation provides enhanced delamination resistance.

If a heat shrinkable film is desired, after extrusion and cooling, then after irradiation (or without irradiation), the tube may then be heated to soften it, and then the softened tube is passed through pinch rolls and stretch oriented by the trapped blown bubble technique discussed above.

The films in accordance with the present invention also have excellent see-through properties which is advantageous for reading code numbers preprinted on a product wrapped with the film.

The antistatic agents useful in the present invention are substantially non-hygroscopic and substantially non-migratable. Suitable antistatic agents may be selected from (a) fatty acid esters of poly-hydroxy alcohols, (b) polyalkoxylated compounds (i.e. polyethers) such as polyethylene oxides, polypropylene oxides, polybutylene oxides, polytetramethylene oxides, the reaction products of polyalkoxylates with fatty acids, the reaction products of polyalkoxylates with fatty alcohols, the reaction products of polyalkoxylates with fatty acid esters of poly-hydroxyl alcohols (for instance polyalkoxylate reaction products of fatty acids, of fatty glycols, of fatty sorbitols, of fatty sorbitans, and of fatty alcohols), or a mixture thereof, or a mixture of (a) and (b). Suitable fatty group chains in either (a) or (b) are desirably from about $C_8$ to about $C_{20}$. The polyether chain in the suitable polyalkoxylated compounds are of the formula $(-OC_xH_{2x}-)_n$ wherein x is from 2 to about 8, wherein the alkyl group is straight or branched, and wherein n is from 2 to about 1000. Each agent will work by itself in a polymeric composition, as such antistatic compositions exhibit excellent static decay times; however, the combination of agents (a) and (b) in a polymeric composition is more desirable as these antistatic compositions display even shorter static decay times. Desirable fatty acid ester substituted polyhydroxy alcohols include, but are not limited to, the polyhydroxy alcohols selected from the $C_2$ to $C_6$ alcohols, such as ethylene glycol, 1,3-propylene glycol, 1,2-propylene glycol, 1,2-butanediol, meso2,3-butanediol, 1,4-butanediol, pinacol, pentaerythritol, 1,2,3,4,5-pentanepentol, sorbitan, or sorbitol, which polyhydroxy alcohol has been substituted with one or more fatty acid ester groups. A very desirable fatty acid ester substituted polyhydroxy alcohol is glycerol monosterate. A desirable polyether is polyethylene oxide, such as that sold by Union Carbide under the trade name Polyox, or is polytetramethylene oxide, such as that sold by du Pont under the trade name Terathane. A very desirable polyalkoxylate of a fatty alcohol is a polyethoxylated cetyl alcohol, as represented by the formula $C_{16}H_{33}-O(-C_2H_4-O-)_nH$ wherein n is from 2 to about 50.

The antistatic agent may be incorporated into any polymer. Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible symmetrical structures of the material. These structures include, but are not limited to, isotatic, syndiotactic and random symmetries.

Suitable thermoplastic polymers useful in the present invention are the "polyethylenes". The term "polyethylene" as used herein refers to families of resins obtained by substantially polymerizing the gas ethylene, $C_2H_4$. By varying the comonomers, catalysts and methods of polymerization, properties such as density, melt index, crystallinity, degree of branching and cross-linking, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.928 g/cc are called low density polyethylenes (LDPE) while those having densities from about 0.929 g/cc to about 0.940 g/cc are called medium density polyethylenes (MDPE), and those having densities from about 0.941 g/cc to about 0.965 g/cc and over are called density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, for a type of polyethylene which may be employed in the present invention, refers to the newer copolymers of ethylene with one or more comonomers selected from $C_4$ to $C_{10}$ alpha olefins such as butene-1, pentene-1, hexene-1, octene-1, etc. in which the molecules thereof comprise long chains with few side chains branches or cross-linked structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. LLDPE is well known for its structural strength and anti-stresscracking properties. Thus, it serves well in a wrap around material for packaging electronic components which typically have sharp projections. Also, LLDPE is known for its favored properties in the heat shrink process, and thus is well suited if it is desired to make a heat shrinkable film as discussed above. Also, very low density linear low density polyethylenes (VLDPE) may be employed, and such typically have a density from about 0.910 g/cc to about 0.860 g/cc, or even lower.

The term "ethylene vinyl acetate copolymer" (EVA) as used herein, for a type of polyethylene, refers to a copolymer formed from ethylene and vinyl acetate monomers wherein the ethylene derived units in the copolymer are present in major amounts and the vinyl acetate derived units in the copolymer are present in minor amounts. EVA is also known for having structural strength, as LLDPE does.

Blends of all families of polyethylenes, such as blends of EVA, VLDPE, and LLDPE, may also be advantageously employed.

Advantageously, the admixture of polymer and antistatic agent also includes a small amount of about 10% by weight or less, more desirably about 7% by weight or less of an antiblock, to help alleviate any tackiness. A suitable antiblock is EPE 8160 supplied by Teknor Apex.

An "oriented" or "heat shrinkable" material is defined herein as a material which, when heated to an appropriate temperature above room temperature (for example 96° C.), will have a free shrink of 5% or greater in at least one linear direction.

MATERIALS

Trycol (TM) 5984 is a polyethoxylated cetyl alcohol supplied by Emery Industries.

Food grade glyceryl monostearate CPH-53-N is supplied by C. P. Hall.

EVAL (TM) is EVOH (ethylene vinyl alcohol polymer) supplied by EVAL Corporation.

Alathon F-3445 is an EVA having about 3.5% vinyl acetate. It is supplied by du Pont.

Elvax 3130 is an EVA having about 12% vinyl acetate. It is supplied by du Pont.

EVA PE 202 CS-287 (formerly PE 202 CS-284 and XO-757) is an ethylene/vinyl acetate copolymer supplied by El Paso.

EVA LD-318.92 is an ethylene/vinyl acetate copolymer supplied by Exxon.

EVA 32.89 is an ethylene/vinyl acetate copolymer supplied by Exxon.

Dowlex (TM) is Dowlex 2045, which is a linear low density polyethylene supplied by Dow Chemical Company, Midland, Mich.

Escorene (TM) is Escorene LL 3001.63, which is a linear low density polyethylene supplied by Exxon.

Chemplex 3405 is a LDPE supplied by Chemplex Company, Rolling Meadows, Ill.

EPE 8160 clear concentrate antiblock is a micron sized silica supplied by Teknor Apex.

EXAMPLES

The following Examples illustrate the preferred embodiments of the invention. It is not intended to limit the invention thereby.

The compositions in accordance with the present invention have an increased tendency to dissipate electrostatic charges. In the examples below, the ability of each of samples containing the agent to dissipate a static charge was measured using the procedure described in Federal Test Method Standard 101C, Method 4046.1, "Electro-static Properties of Materials" (change notice dated Oct. 8, 1982) on a static decay meter. Such meters are commercially available, such as the 406C static decay meter supplied by Electrotech Systems, Inc. Except where differences are indicated, samples were conditioned at about room temperature at less than about 15% relative humidity for about 24 hours. After conditioning each was placed in a static decay meter at 72°–73° F. (22°–23° C.) and charged to ±5000 VDC (volts direct current) at less than about 15% relative humidity. The time for 99% of the charge to dissipate was then measured.

EXAMPLE I

Using the method of tubular coextrusion followed by hot blowing a bubble to make a non-oriented film as described above, a single layer film was made having the following composition: Escorene LL 3001.63 LLDPE with 1% by weight Trycol 5984 and 0.5% by weight glyceryl monostearate CPH-53-N, hereinafter designated as F1 (film number 1). A sample was cut of the size of about 3⅛×7½ inches (about 7.9×19 cm). After conditioning the sample for 1 hour (instead of 24 hours) at 72° F. (22° C.) at less than 15% relative humidity, the static decay time was found to be 130 milliseconds. The sample was tested again 4 days later, and the static decay time was found to be 77 milliseconds.

EXAMPLE II

A single layer film was made as in Example I, but comprising F1+5% by weight EPE 8160.

EXAMPLE III

Four additional samples were cut of the size of about 3⅛×7½ inches (about 7.9×19 cm) of F1 of Example I, and all were conditioned for 1 hour (instead of 24 hours) at 72° F. (22° C.) at less than 15% relative humidity. Then they were tested for static decay. Then, each of the 4 samples was subjected to a different pretreatment for 88 hours, as indicated in Table A below, and again conditioned for 1 hour at 72° F. (22° C.) at less than 15% relative humidity, and checked again for static decay.

TABLE A

| Sample | Pretreatment | Static Decay Time Before Pretreating (Milliseconds) | Static Decay Time After 88 Hour Pre-treatment (Milliseconds) |
| --- | --- | --- | --- |
| a | 72° F. (22° C.) 15% Relative Humidity | 370 | 101 |
| b | 160° F. Oven (71° C. Oven) in which a beaker of water was kept to maintain a humid atmosphere | 67 | 141 |
| c | 160° F. Oven (71° C. Oven) without the beaker of water | 188 | 51 |
| d | Vacuum jar maintained at a pressure under 20 Torr at 73° F. (23° C.) | 312 | 87 |

As can be seen from the Table, even after abusive treatments of heat, humidity and vacuum, the film samples still had excellent static decay times well within the desired 2000 millisecond range.

EXAMPLE IV

Single layer films F2, F3, and F4, were made as in Example I, except that instead of the polyethylene Escorene LL 3001.63, the following polyethylenes were used: F2 was Alathon F-3445 EVA with 1% by weight Trycol 5984 and 0.5% by weight glyceryl monostearate CPH-53-N; F3 was Elvax 3130 EVA with 1% by weight Trycol 5984 and 0.5% by weight glyceryl monostearate CPH-53-N; and F4 was Chemplex 3405 LDPE with 1% by weight Trycol 5984 and 0.5% by weight glyceryl monostearate. Samples were cut of the size of about 3½×7½ inches (about 7.9 to 19 cm) for testing. Each was conditioned at 72° F. (22° C.) for 1 hour (instead of 24 hours) at less than 15% relative humidity and then checked for static decay. The results are summarized in Table B below.

TABLE B

| Sample | Static Decay Time (Milliseconds) |
| --- | --- |
| F2 | 552 |
| F3 | 173 |
| F4 | 58 |

EXAMPLE V

To illustrate the effect of a lesser static time by employing a combination of both Trycol 5984 and glyceryl monostearate, as described above in Example I, two single layer films were made as in Example I, but one of them, F1(a), was made without glycerol monostearate, and the other F1(b) was made without Trycol 5984. F1(a) was Escorene LL 3001.63 LLDPE with 1% by weight Trycol 5984. F1(b) was Escorene LL 3001.63 LLDPE with 0.5% by weight glyceryl monostearate. Samples were cut of the size of about 3½×7½ inches (about 7.9 to 19 cm) for testing. Each was conditioned at 72° F. (22° C.) for 1 hour (instead of 24 hours) at less than 15% relative humidity and then checked for static decay. The results are summarized in Table C below.

TABLE C

| Sample | Static Decay Time (Milliseconds) |
| --- | --- |
| F1 (a) | 1203 |
| F1 (b) | 485 |

As can be seen the static decay time of 77 milliseconds of Example I is much less than the static decay times reported in Table C.

EXAMPLE VI

Using the method of tubular coextrusion followed by hot blowing a bubble to make a non-oriented film as described above, a multi-ply film was made having the following structure wherein F1 was Escorene LL 3001.63 LLDPE with 1% by weight Trycol 5984 and 0.5% by weight glyceryl monostearate CPH-53-N.:

| Layer | Material |
| --- | --- |
| 1 | F1 + 5% by weight EPE 8160 |
| 2 | F1 |
| 3 | F1 + 5% by weight EPE 8160 |

A sample was cut of about 3⅛×7½ inches (about 7.9×19 cm) and left to sit at ambient conditions for about 88 hours and then conditioned for 1 hour (instead of 24 hours) at 72° F. (22° C.) at less than 15% relative humidity, and the static decay time tested. The time to decay was found to be 101 milli-seconds.

EXAMPLE VII

A film was made as in Example VI, except that the film was irradiated at 4.3 MR after coextrusion and hot blowing the bubble. The resultant was observed to be of improved structural integrity. A sample of about 3½×7½ inches (about 7.9×19 cm) was left to sit at ambient conditions for about 88 hours and then conditioned for 1 hour (instead of 24 hours) at 72° F. (22° C.) at less than 15% relative humidity and the static decay time was found to be 53 milliseconds.

The film was cut into samples of about 3⅛×7½ inches (about 7.9×19 cm), for running tests. The samples were conditioned for 1 hour (instead of 24 hours) at 72° F. (22° C.) at less than 15% relative humidity. Then, they were tested for surface resistivity and static decay. Then, each sample was subjected to a different pretreatment for 88 hours, as indicated in Table D below, and again conditioned for 1 hour at 72° F. (22° C.) at less than 15% relative humidity, and checked again for surface resistivity and static decay.

TABLE D

| Sample | (88 Hours) Pretreatment | Before Pretreatment | | After Pretreatment | |
|---|---|---|---|---|---|
| | | Surface Resistivity (ohms/square) | Static Decay (MS) | Surface Resistivity (ohms/square) | Static Decay (MS) |
| a | 72° F. (22° C.) | $1 \times 10^{10}$ | 39 | $2 \times 10^{10}$ | 44 |
| b | 160° F. Oven (71° C. Oven) in which a beaker of water was kept to maintain as humid atmosphere | $6 \times 10^{10}$ | 46 | $9 \times 10^{10}$ | 154 |
| c | 160° F. Oven (71° C. Oven) without the beaker of water | $6 \times 10^{10}$ | 39 | $9 \times 10^{10}$ | 144 |
| d | Vacuum jar maintained at a pressure under 20 Torr at 73° F. (23° C.) | $5 \times 10^{10}$ | 52 | $4 \times 10^{10}$ | 115 |
| e | 24 hour water shower after which sample was blotted dry with a towel | $7 \times 10^{10}$ | 49 | $1 \times 10^{14}$ | Over 20 Seconds |

As can be seen from the Table, surface resistivity either before or after each abusive pretreatment was still in the desirable antistatic range of about $10^9$ to $10^{14}$, and likewise either before or after each abusive pretreatment (except for the 24 hour water shower), the static decay time was less than the desirable 2000 milliseconds (MS).

EXAMPLE VIII

Another set of samples of the unirradiated film of Example VI were cut to a size of about $3\frac{1}{2} \times 7\frac{1}{2}$ inches (about $7.9 \times 19$ cm) subjected to the different 88 hour pretreatment abuses as in Example III above, and then after conditioning at 1 hour (instead of 24 hours) at 72° F. (22° C.) at less than 15% relative humidity, checked for static decay. The results are summarized in Table E below.

TABLE E

| Pretreatment | Static Decay Time (Milliseconds) |
|---|---|
| 160° F. Oven (71° C. Oven) in which a beaker of water was kept to maintain a humid atmosphere | 141 |
| 160° F. Oven (71° C. Oven) without the beaker of water | 51 |
| Vacuum jar maintained at a pressure under 20 Torr at 73° F. (23° C.) | 87 |

As can be seen from the Table, even after abusive treatments of heat, humidity and vacuum, the film samples still had excellent static decay times well less than the desired 2000 milliseconds.

EXAMPLE IX

Samples cut to a size of about $3\frac{1}{2} \times 7\frac{1}{2}$ inches (about $7.9 \times 19$ cm) of the irradiated film of VII were subjected to the different 88 hour pretreatment abuses as in Example III above, and then after conditioning at 1 hour (instead of 24 hours) at 72° F. (22° C.) at less than 15% relative humidity, checked for static decay. The results are summarized in Table F below.

TABLE F

| Pretreatment | Static Decay Time (Milliseconds) |
|---|---|
| 160° F. Oven (71° C. Oven) in which a beaker of water was kept to maintain a humid atmosphere | 370 |
| 160° F. Oven (71° C. Oven) without the beaker of water | 218 |
| Vacuum jar maintained at a pressure under 20 Torr at 73° F. (23° C.) | 262 |

As can be seen from the Table, even after abusive treatments of heat, humidity and vacuum, the film samples still had excellent static decay times well under the desired 2000 milliseconds.

EXAMPLE X

Using a bubble cap machine such as those described in U.S. Pat. No. 4,576,669 and U.S. Pat. No. 4,579,516 both to Caputo, the film of Example VI is fed into the machine to make bubble cap. A first roll of the film is fed into the machine at about 240°–260° F. (about 115°–127° C.) to form $\frac{3}{8}$ inch (0.95 cm) diameter bubbles while a second roll of the film is fed into the machine at about 350° F. (177° C.) to seal to the first roll thereby entrapping air in the bubbles.

Electronic circuit boards are wrapped with the resultant bubble cap film. The film is very tough and afforded excellent cushioning. Also, no corrosion of the wrapped board is observed during storage. Also, portable work stations such as those according to U.S. Pat. No. 4,494,651 are lined with resultant bubble cap.

EXAMPLE XI

Bubble cap is made as in Example X, but using the irradiated film of Example VII instead of the unirradiated film of Example VI.

Electronic circuit boards are wrapped with the resultant bubble cap film. The film is very tough and afforded excellent cushioning. Also, no corrosion of the wrapped board is observed during storage. Also, portable work stations such as those according to U.S. Pat. No. 4,494,651 are lined with resultant bubble cap.

While certain representative embodiments and details have been shown for the purpose of illustration, numerous modifications to the formulations described above can be made without departing from the invention disclosed.

What is claimed is:

1. A method for protecting packaged static sensitive devices from electrostatic charges comprising:
   (a) providing a package comprising an antistatic film having one or more layers, wherein at least one layer comprises a composition of a thermoplastic polymer in admixture with an antistatic agent wherein the polymer is polyethylene and the antistatic agent is a mixture of both fatty acid ester of polyhydroxy alcohol and polyalkoxylated compound, and wherein said film will, after 12 days at 160° F. (71° C.), still exhibit antistatic characteristics of a static decay time less than about 2000 milliseconds at low humidity less than about 15% relative humidity; and
   (b) conforming said film about a selected device.

2. The method of claim 1, wherein the antistatic agent is present in the admixture in an amount less than about 20% by weight.

3. The method of claim 2, wherein the antistatic agent is present in the admixture in an amount less than about 15% by weight.

4. The method of claim 1, wherein an antiblock in a weight amount of about 10% or less included in the admixture.

5. The method of claim 1, wherein said film comprises a monolayer film.

6. The method of claim 1, wherein said film comprises a film having at least two layers wherein at least one layer of said at least two layers comprises a polyethylene in admixture with both a fatty acid ester of polyhydroxy alcohol and a polyalkoxylated compound.

7. The method of claim 1, wherein said film is oriented.

* * * * *